SPACE SATELLITE COMMUNICATIONS REPEATER

Filed Dec. 12, 1961 6 Sheets-Sheet 1

INVENTOR
A. J. GIGER
BY [signature]
ATTORNEY

SPACE SATELLITE COMMUNICATIONS REPEATER

Filed Dec. 12, 1961 6 Sheets-Sheet 2

INVENTOR
A. J. GIGER
BY
[signature]
ATTORNEY

Feb. 8, 1966 A. J. GIGER 3,234,551

SPACE SATELLITE COMMUNICATIONS REPEATER

Filed Dec. 12, 1961 6 Sheets-Sheet 3

INVENTOR
A. J. GIGER
BY [signature]
ATTORNEY

Feb. 8, 1966 A. J. GIGER 3,234,551

SPACE SATELLITE COMMUNICATIONS REPEATER

Filed Dec. 12, 1961 6 Sheets-Sheet 4

INVENTOR
A. J. GIGER
BY
ATTORNEY

INVENTOR
A. J. GIGER
BY [signature]
ATTORNEY

INVENTOR
A. J. GIGER
BY [signature]
ATTORNEY 3,234,551
SPACE SATELLITE COMMUNICATIONS REPEATER Adolf J. Giger, Murray Hill, N.J., assignor to Bell Telephone Laboratories, Incorporated, New York, N.Y., a corporation of New York
Filed Dec. 12, 1961, Ser. No. 158,657
14 Claims. (Cl. 343—100)

This invention relates to space satellite communication stations, and more particularly, to such communication stations for engaging in directional transmission to and/or from ground communication stations.

In the practice of communications by active space satellites, satellite orientation with respect to the ground stations with which communications are to be carried on is a prime consideration. Should the ground station move outside the field of operation of the satellite antenna system, communications would be disrupted while this condition exists. A satellite's attitude with respect to a ground station may change a great deal during each orbital revolution. The attitude changes with respect to the particular ground stations with which communications are to be carried on would probably be even greater in an actual world-wide system because the satellite would continuously pick up and drop different ground stations as it moved through its orbit. It would be desirable from the point of view of the communications engineer to transmit to and receive from the ground stations with a highly directional antenna system on the satellite. This would greatly reduce the size, weight and power consumption of the satellite electronic equipment while still maintaining high transmission standards over the satellite link. Unfortunately, the more directional the satellite antenna system, the more control must be exerted over the satellite's attitude with respect to the ground station. The art of guidance and control of satellite bodies has as yet not advanced sufficiently to permit of the high degree of satellite orientation or attitude stabilization necessary to carry on directional communications in space, while at the same time conforming with the demanding requirements of size, weight, power efficiency and component reliability of a practical satellite system.

It was at first considered that it might be feasible to provide satellites with isotropic antenna systems, thus avoiding the problem of orientation or attitude control altogether. A truly isotropic antenna system for satellites, however, has proven difficult to come by and, moreover, its isotropic characteristics are in many ways objectionable for point to point communications, due to the wasteful transmission of power and indiscriminate reception of signal and noise.

A partially stabilized satellite having an antenna system with somewhat directional characteristics compatible with the control exercised over the satellite has been proposed as a compromise measure. In such a system, a spherical satellite communication station is "spin oriented" in an orbit around earth so that its spin axis lies perpendicular to the orbital plane. A slot antenna disposed around the periphery of the satellite in a plane perpendicular to the spin axis will provide isotropic radiation in the orbital plane and somewhat directional radiation in a plane perpendicular to it. This arrangement leaves room for improvement, however, by virtue of the fact that it is merely a compromise. Only a small fraction of the isotropic radiation pattern in the plane normal to the spin axis is utilized at any given instant. Moreover, if any advantage is to be realized at all, proper orientation of the spin axis must be established and maintained to a high degree of accuracy.

It is, therefore, the object of the present invention to improve the directivity of communications between an unstabilized space satellite and a remote station.

In accordance with the above object, plural directional antennas each capable of both receiving and transmitting electromagnetic waves are mounted on the surface of a satellite body. The antennas are distributed around the satellite so that each one has a different field of coverage. In the aggregate the antennas provide the satellite with potentially isotropic antenna coverage, i.e., regardless of satellite orientation within the line of sight of a given ground station there is always at least one antenna on the satellite located to carry on communications with the ground station. In one embodiment the isotropic antenna coverage is obtained by twelve antennas each having identical circularly symmetrical radiation patterns uniformly distributed over the satellite body. Such an arrangement provides complete coverage with very little overlap of radiation patterns between adjacent antennas.

A beacon signal is directed toward the satellite from the ground station with which the satellite is to carry on communications. Samples of the signal level of the beacon signal received by the various antennas are taken, from time to time, and the antenna receiving the strongest beacon signal is determined from certain operations performed upon the samples. The antenna so selected is the one that provides the most efficient transmission to and reception from the ground station. Accordingly, communication with the ground station is then carried out by means of the selected antenna exclusive of the remainder of the antennas. When the satellite has changed its attitude so that a different antenna would more effectively communicate with the ground station this fact is manifested through the sampling operation. A new antenna is then "switched in" and the old antenna "switched out." In this way, directional transmission of signals from and reception of signals by the satellite can be accomplished without regard to orientation of the satellite.

The satellite station described above is adaptable to two-way transmission as a communications repeater. In this case, a beacon signal is transmitted from a first ground station toward the satellite to determine the satellite antenna to be employed in transmitting to the first ground station information received by the satellite repeater from a second station. Information transmitted from the first station is also received over the selected antenna. Similarly, a beacon signal transmitted from the second ground station toward the satellite repeater provides a measure to determine the proper satellite antenna for transmission to the second station of information received by the satellite repeater from the first station and for reception of information from the second station.

A feature of the invention provides simple and effective electronic circuitry for selecting and connecting for operation the antenna receiving the strongest response to the beacon signal transmitted from a ground station. Upon actuation by a command signal from one of the ground stations, a first set of samples of the beacon signal level as received by the antennas is taken, followed immediately by a second set of samples. The first set of samples is applied to a storage element which registers the largest one of the samples. The second set of samples and the output from the storage element are applied to a voltage comparator that produces an indication when the two inputs are equal. When the two inputs to the comparator are equal during occurrence of the second set of samples, the antenna receiving the strongest response is being sampled and the indication from the comparator actuates control circuitry causing the antenna being sampled to be "switched in" and any other antenna theretofore in operation to be "switched out."

The above and other features of the invention will be considered in detail in the following specification taken in conjunction with the drawings in which.

Figure 1:
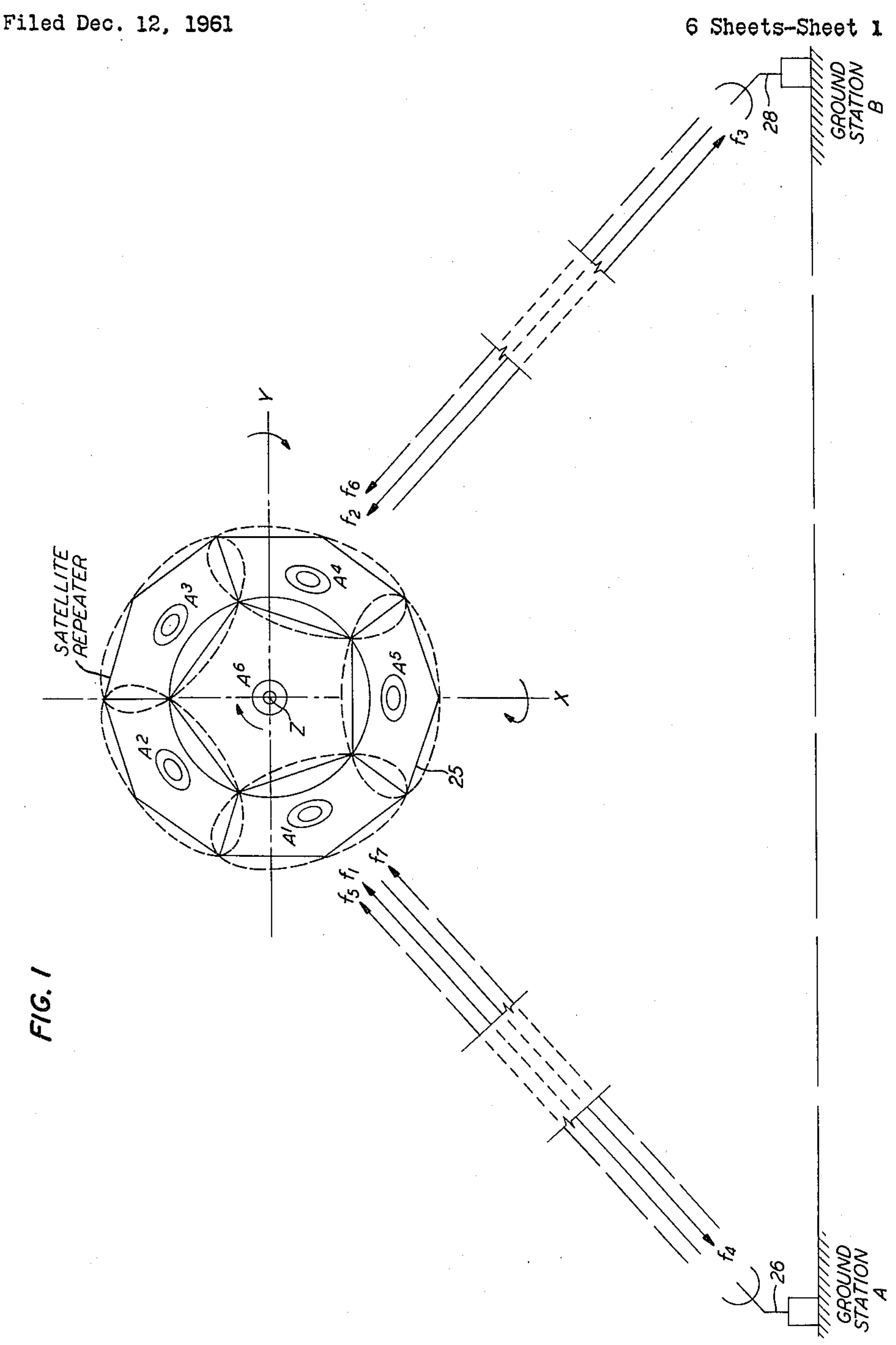
FIG. 1 depicts a satellite body with antennas distributed over the satellite surface and ground stations with which the satellite is communicating.

In FIG. 1 a satellite repeater is shown that serves as a communications link between a ground station A and a ground station B. Antennas $A^1$ through $A^{12}$, some of which are not shown, are distributed uniformly over the surface of a satellite body 25 illustrated in the form of a dodecahedron. With twelve uniformly distributed antennas the ideal radiation pattern required for each antenna to give complete isotropic antenna coverage, regardless of the form of body 25, without any overlap of the radiation patterns from adjacent antennas is in the shape of a regular pentagon. This is, of course, a difficult antenna pattern to produce in practice, but can be closely approximated by a circular radiation pattern, i.e., a radiation pattern having circular symmetry, circumscribing the pentagon. Antennas $A^1$ through $A^{12}$ are accordingly designed to produce circular radiation patterns. Although any number of antennas may be mounted on body 25, the number twelve, because it calls for pentagonal radiation patterns that can be closely approximated by circular radiation patterns, proves particularly advantageous. In this way, each antenna serves a different solid angle, the aggregate of which provides antenna coverage over a 360 degree solid angle without appreciable redundancy in antenna coverage. As shown, antennas $A^1$ through $A^{12}$ themselves take up little of the surface space of body 25 and solar cells to generate power for the satellite equipment may be mounted on the satellite surface as well.

An information-bearing radio signal and a beacon radio signal represented by $f_1$ and $f_5$, respectively, are transmitted from a directional antenna 26 at ground station A toward the satellite repeater. Likewise, a directional antenna 28 at ground station B transmits an information-bearing radio signal and a beacon radio signal represented by $f_2$ and $f_6$, respectively, to the satellite repeater. The individual satellite antennas for carrying on the most favorable transmission between the satellite repeater and ground stations A and B are determined in the satellite by measuring from time to time the antennas that receive the strongest response to beacon signals $f_5$ and $f_6$, respectively. The antenna receiving the strongest response to $f_5$ is utilized exclusive of the other eleven antennas to receive signal $f_1$ from ground station A and to transmit to ground station A the information carried to the satellite by signal $f_2$ from the ground station B, modulated upon a radio signal $f_4$. The other antenna, receiving the strongest response to beacon signal $f_6$, receives signal $f_2$ from ground station B and transmits to ground station B the information carried to the satellite by signal $f_1$ from ground station A, modulated upon a signal $f_3$, exclusive of the other eleven antennas. Satellite body 25 is shown as rotating about X, Y, and Z axes as would generally be the case in actual operation. Since there is always an antenna in position to carry on directional transmission to and reception from either ground station, satellite orientation is not material to effective satellite communications. However, to increase the life of the satellite components, it would be desirable to employ some form of satellite spin damping. This will reduce the rate of change of satellite attitude with respect to the ground stations and, therefore, the frequency with which the antenna selecting, control, and sampling circuitry about to be described need operate.

Figure 2:
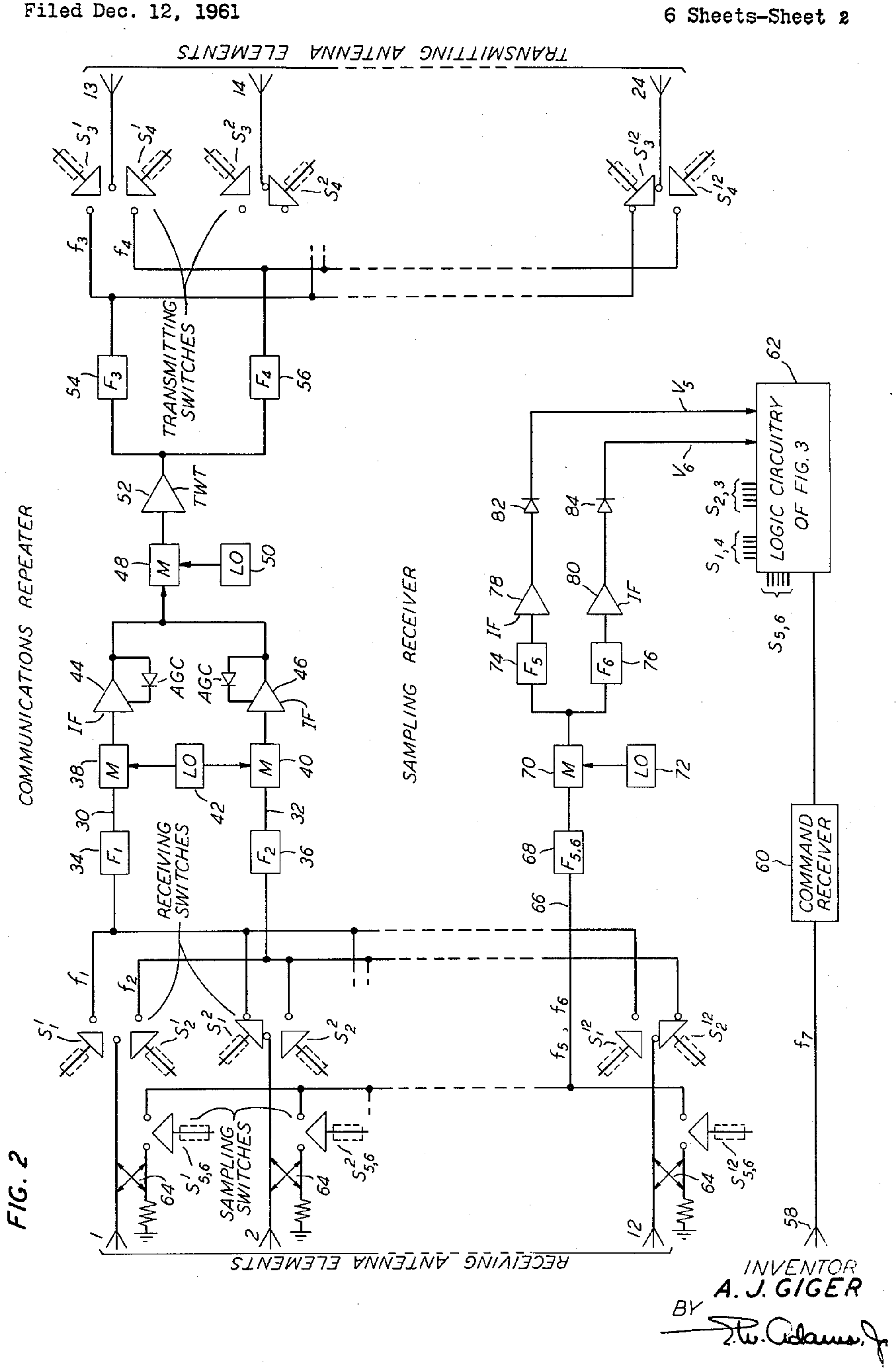
FIG. 2 is a schematic diagram in block form of the control circuitry and repeater cricuitry housed within the satellite body of FIG. 1.

In FIG. 2, receiving antenna elements 1 through 12 of antennas $A^1$ through $A^{12}$, respectively, are shown connected via receiving switches $S_1^1$ through $S_1^{12}$, respectively, to a branch 30 restrictive in frequency to signal $f_1$ and via receiving switches $S_2^1$ through $S_2^{12}$, respectively, to a branch 32 restrictive in frequency to signal $f_2$. Branches 30 and 32 constitute a communications repeater. The output of the communications repeater is connected through transmitting switches $S_3^1$ through $S_3^{12}$ and $S_4^1$ through $S_4^{12}$ to transmitting antenna elements 13 to 24, respectively, of antennas $A^1$ through $A^{12}$, respectively. The "$S_1$" receiving switches operate one at a time according to which antenna is most favorably oriented for communication with ground station A and in conjunction with the "$S_4$" transmitting switch corresponding to the same antenna. The "$S_2$" receiving switches also operate individually and in conjunction with the corresponding "$S_3$" transmitting switch to connect the optimum antenna to communicate with ground station B. Filters 34 and 36 isolate signals $f_1$ and $f_2$ to permit application to branches 30 and 32, respectively. Signals $f_1$ and $f_2$ are converted to an intermediate frequency in modulators 38 and 40, respectively, under the direction of the output from a common local oscillator 42 whereupon they are amplified by intermediate-frequency amplifiers 44 and 46, respectively, each of which is provided with automatic gain control. At this point, branches 30 and 32 merge and the combined intermediate-frequency signals are reconverted to suitable transmitting frequencies in modulator 48 by the output of a local oscillator 50. The signals, now represented by $f_3$ and $f_4$, are applied to a traveling wave tube amplifier 52 for joint amplification in preparation for transmission and then separated by filters 54 and 56, tuned to $f_3$ and $f_4$, respectively. The output of filter 54 is connected to the "$S_3$" transmitting switches for transmission to ground station B over one of the transmitting antenna elements 13 through 24 whose receiving element is supplying branch 32 with signal $f_2$. Similarly, the output from filter 56 is applied via the "$S_4$" transmitting switches to one of the transmitting elements 13 through 24 whose receiving element is supplying branch 30 with signal $f_1$, for transmission to ground station A.

From time to time, at a frequency of occurrence determined by the rate of spin of the satellite repeater, samples are made of the beacon signals $f_5$ and $f_6$ received by the various receiving antenna elements. A command signal $f_7$, transmitted from ground station A, for example, and intercepted by an antenna 58 in the satellite, initiates each sampling cycle. Antenna 58 could be formed of satellite body 25 itself by separating the body into four parts isolated from one another at the frequency of signal $f_7$. The command signal in this case could be a single frequency tone amplitude modulated upon a low-frequency carrier. The command signal is demodulated in a command receiver 60 and applied to logic circuitry 62 that controls the sampling and switching of antennas $A^1$ through $A^{12}$. The control of the "$S_{5,6}$" sampling switches from the logic circuitry is indicated by the leads labeled "$S_{5,6}$" emanating from block 62. Upon initiation by command signal $f_7$, sampling switches $S_{5,6}^1$ through $S_{5,6}^{12}$ are operated one after the other in succession. The resulting samples of beacon signals $f_5$ and $f_6$ are applied together through one of directional couplers 64, individual to each of antennas $A^1$ through $A^{12}$, and the closed "$S_{5,6}$" sampling switch to a branch 66 of the sampling receiver. Signals $f_5$ and $f_6$ are applied through a filter 68 to a modulator 70 where they are converted to an intermediate frequency by beating with the output from a local oscillator 72. At this point, signals $f_5$ and $f_6$ are separated by filters 74 and 76, respectively. The separated signals are amplified in intermediate-frequency amplifiers 78 and 80 and applied to rectifiers 82 and 84. This results in the production of two direct-current voltages, designated $V^5$ and $V^6$ and representative of the signal level of samples of beacon signals $f_5$ and $f_6$, respectively, intercepted by antennas $A^1$ through $A^{12}$, for application to logic circuitry 62. Logic circuitry 62 determines from the samples applied on leads $V^5$ and $V^6$ which of the receiving antenna elements are intercepting the strongest responses to beacon signals $f_5$ and $f_6$ and operates the receiving switches and transmitting switches to switch in the antennas for effecting optimum transmission between ground station A and ground station B via the satellite repeater. The control of the transmitting and receiving switches from the logic circuitry is symbolized by the leads labeled "$S_{2,3}$" and "$S_{1,4}$," respectively, extending from block 62.

Figure 3:
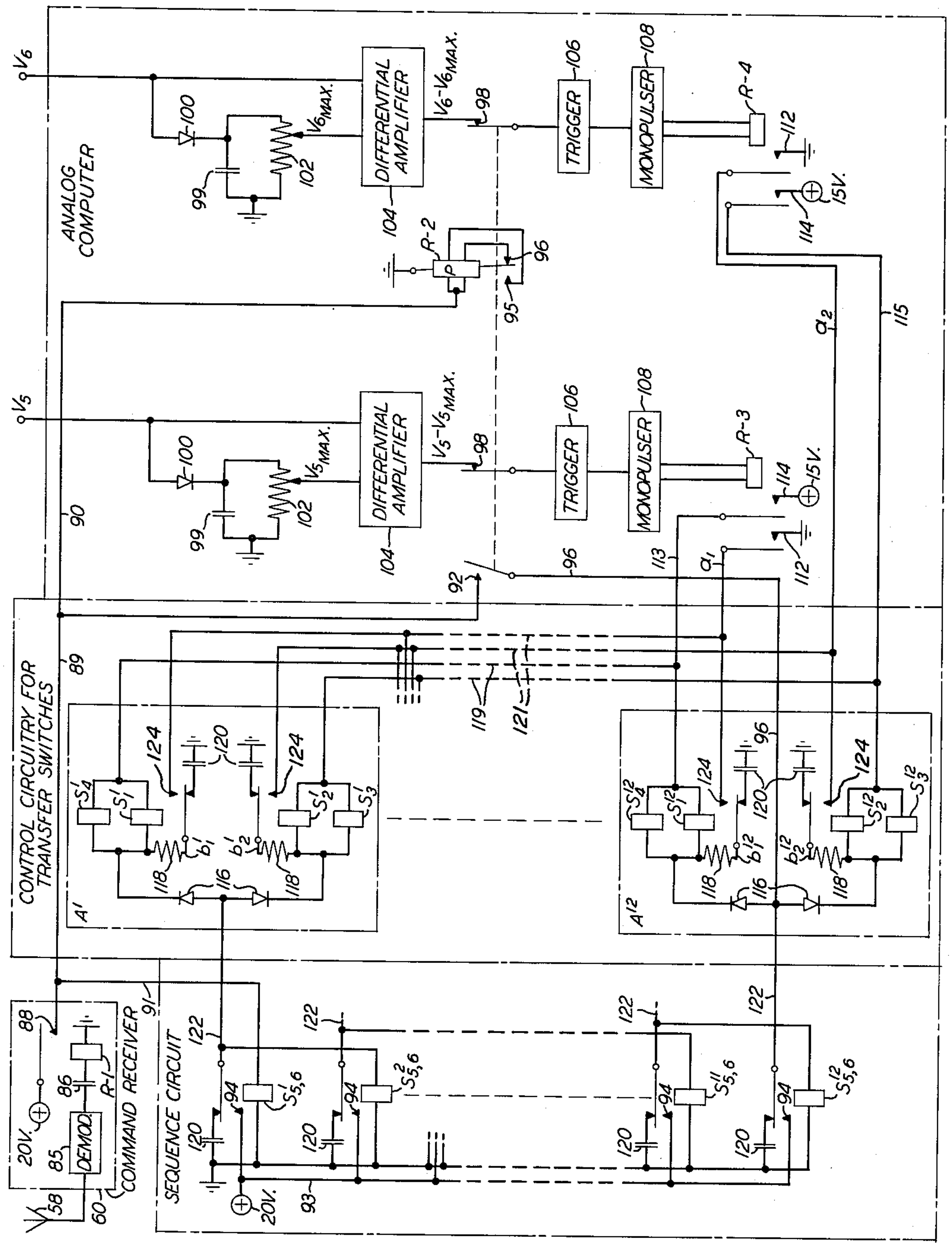
FIG. 3 is a block diagram in schematic form of the logic circuitry for selecting the proper antennas for carrying on communications with the gound stations.
Figure 4:
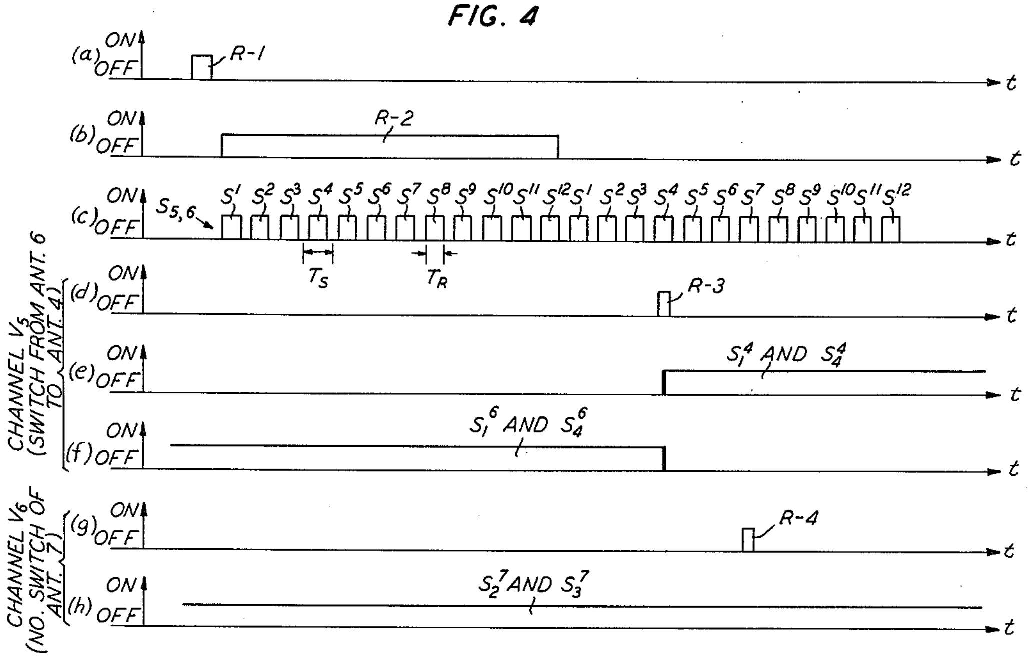
FIGS. 4 and 5 are diagrams helpful in understanding the operation of circuitry in FIG. 3.
Figure 5:
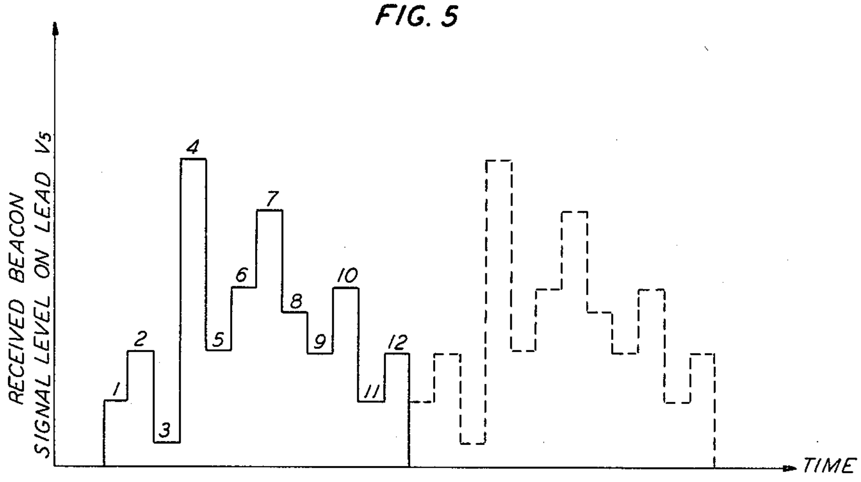

FIG. 3 illustrates the detailed structure of logic circuitry 62, FIG. 4 the sequence of actuation of the switches during one cycle, and FIG. 5 the nature of the signal applied on leads $V_5$ and $V_6$. The coils of the receiving transmitting and sampling switches are duplicated in FIG. 3 to show the manner in which they are controlled. The contacts and arms of the receiving and sampling switches shown in FIG. 3 may, as described hereinafter in connection with FIG. 7, be the same ones that carry the transmission signal frequencies shown in FIG. 2.

Each sampling cycle, with a concomitant possibility of antenna change, is initiated by command signal $f_7$ after passing through a demodulator 85 in command receiver 60. Command signal $f_7$ activates a resonant reed relay R–1, coupled to the output of demodulator 85 through a capacitor 86, for a period, as illustrated in FIG. 4A, of shorter duration than $T_S$, the period between beacon samples. When relay R–1 is activated, a positive voltage from a potential source designated +20 v. appears on leads 89 and 90 through a contact 88 of relay R–1. As a result a latching relay $R_2$, having an operate time of $T_S$, changes state after relay R–1 is released, as shown in FIG. 4B. In this new state of relay $R_2$ contacts 92 and 95 are closed and contacts 98 and 96 are open.

Sampling switches $S_{5,6}^1$ through $S_{5,6}^{12}$ of the sequence circuit each have an operate time of $T_S$ and a release time of $T_R$, the latter being determinative of the duration of the samples taken. During the period that relay R–1 is activated, a voltage from the +20 v. source is applied on lead 91 through contact 88 to the coil of switch $S_{5,6}^1$. By the time that switch $S_{5,6}^1$ operates, relay R–1 is already released. Switch $S_{5,6}^1$, when operated, permits energization of the coil of switch $S_{5,6}^2$ from the +20 v. source through a bus 93 and contact 94 of switch $S_{5,6}^1$. By the time that switch $S_{5,6}^2$ operates, switch $S_{5,6}^1$ is released, because there is no longer an energizing voltage applied to its coil through contact 88. This procedure, as illustrated in FIG. 4C, continues, each switch in succession releasing shortly before the subsequent switch operates. Hence, only the beacon signals of one antenna are sampled at a time.

When switch $S_{5,6}^{12}$ operates in the sequence, relay $R_2$ is again energized, this time from the +20 v. source through bus 93, contact 94 of switch $S_{5,6}^{12}$, lead 96, contact 92 and lead 90. The unlatch time of relay R–2 is $T_R$, after which time contacts 92 and 95 open and contacts 98 and 96 close. Relay R–2 thus unlatches when switch $S_{5,6}^{12}$ releases, as illustrated by FIGS. 4B and 4C. When switch $S_{5,6}^{12}$ operates switch $S_{5,6}^1$ is also energized, this time from the +20 v. source through bus 93 contact 94 of switch $S_{5,6}^{12}$, lead 96, contact 92, lead 89 and lead 91, whereupon the sequence is repeated. It should be noted that after the completion of the second sequence no further sequences are started until a new command signal is received, because contact 92 is open.

As explained above in connection with FIG. 2, the samples of beacon signals $f_5$ and $f_6$ taken from the receiving antenna elements are applied to the sampling receiver wherein signals $f_5$ and $f_6$ are separated. Direct-current signals representative of the levels of the beacon signals $f_5$ and $f_6$ are developed and applied to the analog computer on leads $V_5$ and $V_6$, respectively. FIG. 5 depicts a typical input of beacon signal samples that might be applied on lead $V_5$. During the first set of samples, shown as a solid outline in FIG. 5, a capacitor 99 in the analog computer charges through a diode 100 to a positive potential. The charging time of capacitor 99 is small in comparison with the cycle time, $24T_S$. However, due to the large back resistance of diode 100 and a potentiometer 102 the discharge time of capacitor 99 is large relative to the cycle time. During the first set of samples, capacitor 99 charges to the voltage of the largest sample applied on lead $V_5$, which in FIG. 5 would be represented by the sample from antenna $A^4$. The voltage across capacitor 99 is taken from a tap of potentiometer 102 and applied to a differential amplifier 104 on lead $V_{5_{max}}$. The tap of potentiometer 102 is adjusted to make the signal on lead $V_{5_{max}}$ slightly less than the applied signal. Lead $V_5$ is also connected directly to the input of differential amplifier 104. The output of differential amplifier 104 on lead $V_5 - V_{5_{max}}$ is connected through contact 98, when closed, to a trigger circuit 106 that emits a pulse when a positive potential is applied to its input. A monopulser or monostable multivibrator 108, shapes the pulse from trigger 106 for application to the coil of a relay R–3.

During the second set of samples, shown in FIG. 5 as a dashed outline, upon the occurrence of the largest sample, i.e., from antenna $A^4$, differential amplifier 104 assumes a positive potential and relay R–3 is activated. Activation of relay R–3 during the first set of samples is precluded by maintaining contact 98 open until the second set of samples is taken.

When the maximum sample of beacon signal $f_5$ is being taken for the second time monopulser 108 emits a pulse, as illustrated in FIG. 4D, that energizes relay R–3 into operation for a period slightly shorter than $T_R$, causing contacts 112 and 114 to close. It will be apparent that the analog computer operates upon the samples applied on lead $V_6$ in the same way.

If a change in antennas is called for by the sampling of beacon signal $f_5$, it takes place in the following manner. When contacts 112 and 114 close, contact 94 of the sampling switch corresponding to the antenna to be "switched in" is closed because it is that sampling switch which passed the beacon signal sample that caused monopulser 108 to energize relay R–3. The "$S_1$" and "$S_4$" transmitting and receiving switches corresponding to this sampling switch are activated from the +20 v. source through bus 93, contact 94, lead 122, and a diode 116 to one terminal of the coils, themselves connected in parallel, and from the other terminal of the coils to a +15 v. potential source through a lead 119, a lead 113, and contact 114. The net actuating potential across the coils of the "$S_1$" and "$S_4$" switches of +5 volts operates these switches. The receiving and transmitting switches, unlike the sampling switches, have fast, almost negligible with respect to $T_S$, operate and release times. Capacitors 120 provide transmission signal grounds for the various switches, as will be more fully considered in connection with FIG. 7.

The transmitting and receiving switches corresponding to the antenna that is to be "switched out," are unlatched by the +15 v. source developing a poential of opposite polarity across the coils of the appropriate "$S_1$" and "$S_4$" switches through the circuit including contact 114, lead 113, lead 119, a resistor 118, a contact 124 on the "$S_1$" switch, a lead 121, a lead $a_1$, and contact 112 to ground. The complete procedure is illustrated in FIG. 4E and FIG. 4F wherein switches $S_1^6$ and $S_4^6$ are "switched out" and switches $S_1^4$ and $S_4^4$ are "switched in." By setting the release time of the transmitting and receiving switches greater than the operate time of these switches, the operation is made "hitless," that is the new switch closes before the old switch opens.

If no change in antennas is called for by the sampling of beacon signal $f_6$, when relay R–4 becomes activated contact 124 of the corresponding receiving switch and contact 94 of the corresponding sampling switch already are closed. In this case, the +20 v. potential source is connected to one terminal of the coils of the corresponding "$S_2$" and "$S_3$" switches through bus 93, contact 94, lead 122, and diode 116 while the +15 v. potential source is connected to the other terminal of the coils of these "$S_2$" and "$S_3$" switches through contact 114, lead 115, and lead 119. Relay R–4 becomes deactivated before the sampling switch so that the transmitting and receiving switches remain "switched in." FIGS. 4G and H depict this procedure assuming antenna $A^7$ remains switched in.

The function of resistor 118 is to prevent the transmitting and receiving switches from unlatching by providing most of the +20 volt potential from bus 93 to be at one side of the coils despite the fact that contact 124 is grounded through lead $a_1$ or lead $a_2$ and contact 112. Diodes 116 operate to prevent activation of the improper receiving and transmitting switches by blocking current flow from bus 93 through contact 94 of the activated sampling switch, its transmitting and receiving switch coils, leads 119, the coils of other transmitting and receiving switches, and leads 122 and the coils of the sampling switches to ground.

Figure 6:
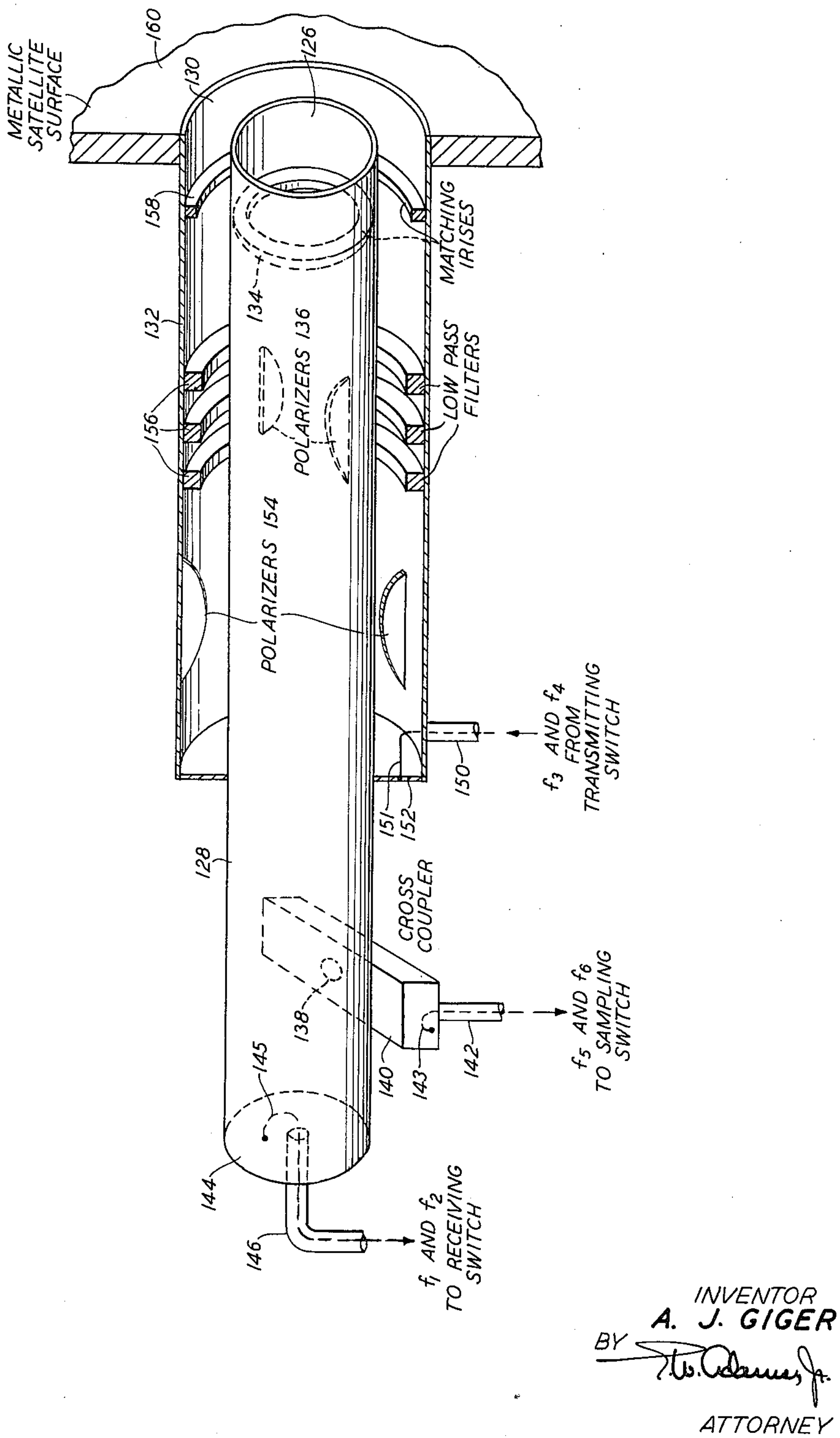
FIG. 6 is a side elevation of a two-way antenna suitable for mounting on the surface of the satellite body of FIG. 1.

FIG. 6 illustrates in detail a directional antenna that meets the requirements of antenna $A^1$ through $A^{12}$. The antenna is designed to transmit radio signals $f_3$ and $f_4$ both in one frequency range and receive radio signals $f_1$, $f_2$, $f_5$, and $f_6$ all in a higher frequency range, all of these signals being circularly polarized. Signals $f_1$, $f_2$, $f_5$, and $f_6$ are received through an aperture 126 of a circular waveguide 128 and signals $f_3$ and $f_4$ are radiated from aperture 130 of a coaxial waveguide 132. Circular waveguide 128 is too small in cross section to permit propagation of frequencies of the order of signals $f_3$ and $f_4$. Very little coupling of signals $f_3$ and $f_4$, therefore, takes place from radiating aperture 130 to intercepting aperture 126. The received signals, traveling in the $TE_{11}$ mode, pass through a matching iris 134 and are converted to linear polarization by polarizers 136. Beacon signals $f_5$ and $f_6$ are abstracted through an opening 138 of a cross coupler 140 and applied to a coaxial cable 142 for transmission to the sampling switch (not shown) by means of a loop coupling 143. Information signals $f_1$ and $f_2$ continue to an end plate 144 where a loop coupling 145 intercepts these signals for transmission on a coaxial cable 146 to the receiving switch (also not shown).

Signals $f_3$ and $f_4$ are conveyed from the transmitting switches (not shown) on a coaxial cable 150 terminating in a loop coupling 151 on an end plate 152 of coaxial waveguide 132. Signals $f_3$ and $f_4$ are coupled by loop 151 into coaxial waveguide 132 in linear polarized form and are propagated through coaxial waveguide 132 in the $TE_{11}$ mode during which time they are converted into circularly polarized signals by polarizers 154. The circularly polarized signals traverse a set of rings 156 constituting a low-pass filter unaffected, pass through a matching iris 158 to aperture 130, and thence into free space. Low-pass filter rings 156 cut off above frequencies of signals $f_3$ and $f_4$, but below the frequencies of signals $f_1$, $f_2$, $f_5$, and $f_6$. Rings 156 create a short circuit across aperture 130 to signals $f_1$, $f_2$, $f_5$, and $f_6$ so that the satellite surface 160 appears to these signals to extend across aperture 130 to the edge of circular waveguide 128. Any of signals $f_1$, $f_2$, $f_5$, and $f_6$ that find their way into coaxial waveguide 132 are alternatively reflected by rings 156.

Additional isolation is afforded between transmitting and receiving antenna elements by imparting different directions of rotation of polarization to the transmitted and received signals. Loop coupling 143, 145, and 151 are situated to accept only linearly polarized signals polarized in one direction and polarizers 136 and 154 are orthogonal to each other. Received signals in soaxial waveguide 132 after conversion to linearly polarized signals are oriented in the wrong direction to couple to loop 151 and are therefore reflected back out of coaxial waveguide 132. The same is true of portions of transmitted signals $f_3$ and $f_4$ cross-coupled into circular waveguide 128.

It is known that a circular or coaxial waveguide carrying signals in the $TE_{11}$ mode has nearly the same radiation pattern in the E and H planes when the aperture is .64 wavelength in diameter. Circularly symmetrical radiation charactristics are an important consideration in antennas for circularly polarized signals. The half power beamwidth of a circular waveguide with a diameter of .64 wavelength is about 75 degrees. This conveniently is the solid angle required of each of antennas $A^1$ through $A^{12}$ to cover satellite body 25 of FIG. 1 isotropically. Hence, by designing apertures 126 and 130 to have diameters of .64 wavelength of the signals to be accommodated, isotropic coverage of a satellite body 25 to within 3 db can be achieved without prohibitive overlap of adjacent antenna radiation patterns. At the same time, signals of all polarizations are accommodated with substantially equal facility.

Figure 7:
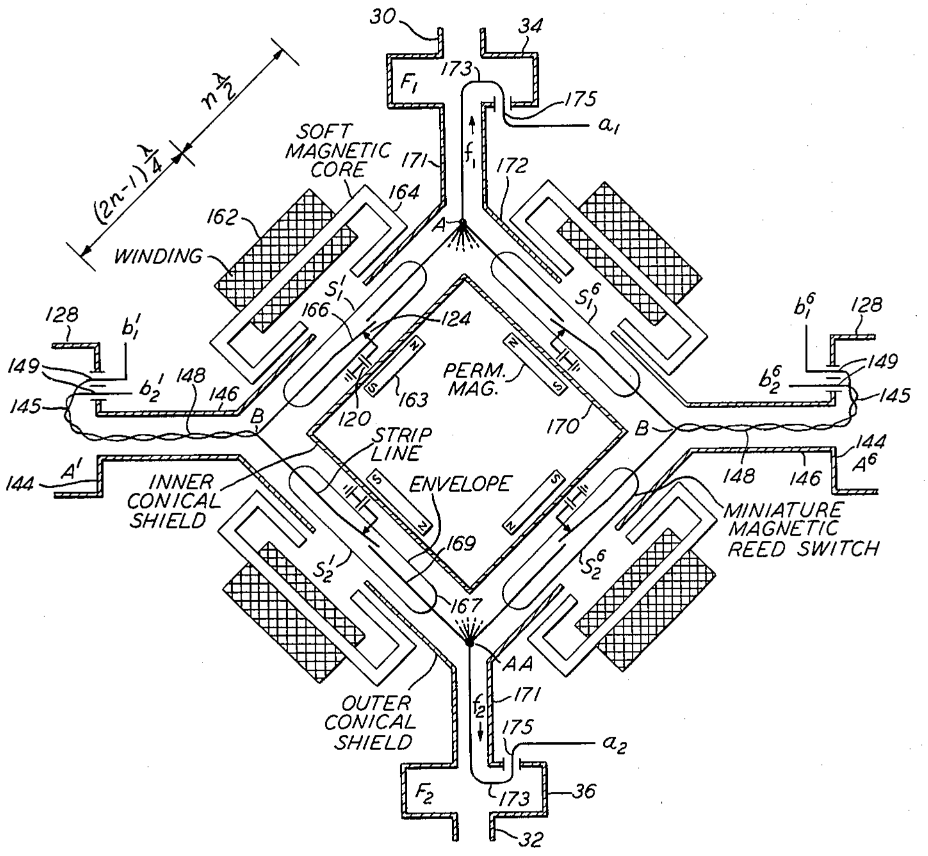
FIG. 7 illustrates in side section view the layout of the transfer switches employed to connect the antennas with the internal repeater circuitry of the satellite.

FIG. 7 shows a sectional view of a layout of receiving switches $S_1^1$, $S_2^1$ through $S_1^{12}$, $S_2^{12}$ which proves advantageous. Switches $S_1^1$, $S_2^1$, $S_1^6$, and $S_2^6$ are shown mounted between and attached to a metallic double conical inner shield 170 and a metallic double conical outer shield 172. The remainder of the receiving switches (not shown) are distributed diametrically around double conical shields 170 and 172 in ten other bridges laid out like $S_1^1$ and $S_2^1$ and $S_1^6$ and $S_2^6$, each interconnecting a different antenna with a pair of common nodes A and AA. The switches are each shielded from their neighboring switches by radial partitions not shown. The receiving switches are of the magnetic reed type each consisting of a winding 162 and a core 164 which generate a magnetic field to control the position of a reed 166 enclosed in an envelope 167. Slits are cut in outer conical shield 172 adjacent each core 164 to avoid undue eddy currents from flowing in shield 172. When the switch is open, reed 166 is clamped to ground for signal frequencies through a contact 124 and a bypass capacitor 120. When the switch is closed, reed 166 completes a signal path through a strip line 169 between nodes A or AA and point B. A permanent magnet 163 latches the switch until a magnetic field of opposite direction is generated to release or unlatch it. Signals $f_1$ and $f_2$ from antennas $A^1$ through $A^{12}$ are connected to their appropriate switches at each point B by means of a pair of conductors 148 of coaxial cable 146 that effectively comprise a single conductor at transmission signal frequencies. Conductors 148 form loop coupling 145 in circular waveguide 128 of each antenna and terminate at end wall 144, insofar as transmission signal frequencies are concerned, through bypass capacitive connections 149. On the other side of each switch, strip line 169 joins at nodes A or AA with the remaining eleven switches for connection to filters 34 and 36, respectively, by coaxial lines 171. Signals $f_1$ and $f_2$ are coupled to filters 34 and 36, respectively, by loop couplings 173 connecting for transmission signal frequencies to the walls of filters 34 and 36 by means of bypass capacitive connections 175. It is desired for maximum power transfer through the switches that when the switches are not operating, they present an infinite impedance, i.e., an open circuit, at points B, A and AA. This is achieved in part by designing the electrical distance between each point B and reed 166 a low, odd multiple of one quarter wavelength of the transmission signal. Then the short circuit at contact 124 appears at point B as an open circuit. Likewise, the impedance of each inoperative switch appearing at nodes A or AA should be infinite. Accordingly, the connections between each switch and nodes A or AA are made an even multiple of a quarter wavelength. Thus, the open circuits at reeds 166 cause open circuits to appear at nodes A and AA. To improve the electrical isolation between points B and A or AA when the switches are not operated, reed 166 is grounded over contact 124 and capacitor 120 for the the communications signals. The mechanical rest for reed 166 provided by contact 124 also helps to stabilize the electrical impedance of the open contact. By virtue of the radial mounting arrangements of the switches, the distance between each point B and nodes A and AA are the same for all switches.

In the case where the two ground stations A and B of FIG. 1 are not widely separated from each other the same antenna will be used to communicate in both directions. Such a mode of operation is made possible by choosing the lengths of coaxial line from filters 34 and 36 to point B so as to give infinite impedances at B for frequencies $f_2$ and $f_1$, respectively.

The same switching paths that carry the signal frequencies are also employed to carry the direct-current control signals required in the logic circuitry of FIG. 3. This is the reason for a pair of twisted conductors 143 between each antenna and points B. Capacitive connections 120, 149, and 175 isolate the direct-current paths from ground. The terminations of the direct-current paths of the switches, designated by $a_1$, $a_2$, $b_1^1$ through $b_1^{12}$, and $b_2^1$ through $b_2^{12}$, correspond to the same designations in FIG. 3 and indicate the points at which the switches are connected to the logic circuitry in FIG. 3.

A similar layout may be used for the transmitting switches without the provisions for D.-C. paths, shown in FIG. 7. Half of the layout may be employed to mount the sampling switches of which there are only half as many. The direct-current paths would be, in this case, similar to those shown in FIG. 7. A termination at filter 68 would be designated $a_{5,6}$ and terminations at the antennas would be designated $b_{5,6}^1$ through $b_{5,6}^{12}$. These terminations are also connected to the corresponding similarly-designated points of the logic circuitry of FIG. 3.

What is claimed is:

1. In a communication system, first and second stations remotely located and relatively movable with respect to one another, means for radiating a first signal from said first station toward said second station, said second station having twelve antennas uniformly distributed to approximate an isotropic field of coverage, a source of information signals located at said second station, means for determining the one of said twelve antennas receiving the strongest response to said first signal comprising means for deriving a first set of samples representative of the level of the portion of said first signal intercepted by each of said antennas, means for deriving a second set of samples representative of the level of the portion of said first signal intercepted by each of said antennas an instant later, means for applying said first set to a storage circuit that stores the one sample of said first set having the largest potential, and means for sensing and indicating when said second set assumes the potential of said stored sample of said first set, and means responsive to said indication for connecting the antenna being sampled to said source of information signals.

2. A communication station comprising twelve antenna untis distributed uniformly about said station, the resultant radiation pattern of said antenna units being isotropic, a load circuit, a source circuit, and means responsive to a control sginal impinging upon said station for selecting and connecting to said load circuit and said course circuit the one of said antenna units providing optimum transmission from said station in the direction of reception of said control signal comprising means for taking a first set of samples representative of the signal level of the control signal intercepted by each of said antenna units, means for taking a second set of samples representative of the signal level of the control signal intercepted by each of said antenna units at a time shortly after the taking of said first set, a storage circuit comprising a diode in series with a capacitor, means for applying said first set to said storage circuit, a differential amplifier having two inputs, means for tapping off the potential stored on said capacitor and applying said potential to one input of said differential amplifier, means for applying said second set to the second input of said differential amplifier, means responsive to the output of said differential amplifier when said second set equals said potential stored on said capacitor for generating a control pulse, and means responsive to said control pulse for connecting the one of said antennas intercepting the strongest signal level of said control signal to said load circuit and to said source circuit.

3. In a communication system, first and second relatively movable, physically separated stations, means for transmitting a first signal from said first station toward said second station, said second station having twelve antenna units each with identical circularly symmetrical radiation patterns, said twelve antennas disposed at said second station such that their radiation patterns are uniformly distributed to give completely isotropic antenna coverage, said antennas each having a receiving element and a corresponding transmitting element, means for determining the one of said receiving elements intercepting the strongest response to said first signal, and means for transmitting a second signal to said first sattion from the transmitting antenna element corresponding to said one of said receiving elements.

4. In a communication system first, second and third stations, said second station serving as a repeater for information conveyed from said first station to said third station, means for radiating a control signal from said third station toward said second station, means for radiating an information-bearing signal from said first station toward said second station, said second station having a plurality of antennas each being oriented in a different direction, a transmission branch in said second station for operating upon signals conveyed between said first and said third station, means for selecting the one of said antennas providing optimum transmission in the direction of reception of said control signal, means for selecting the one of said antennas providing optimum reception in the direction of reception of said information-bearing signal, means for connecting said one antenna providing optimum transmission to the output of said repeater branch, and means for connecting the one of said antennas providing optimum reception to the input of said repeater branch.

5. A communication system comprising fist, second and third stations, said second station serving as a repeater between said first and third stations and being unstabilized in attitude with respect thereto, said second station having twelve antennas with identical circularly symmetrical radiation patterns each oriented in a different direction the aggregate radiation pattern of which is isotropic, means for transmitting an information-bearing signal to said second station from said first station, means for transmitting an information-bearing signal to said second station from said third station, means for selecting the one of said plurality of antennas that receives the strongest response to said signal from said first station, means for confining transmission to and reception from said first station to said selected antenna exclusive of the remainder, means for selecting the one of said plurality of antennas that receives the strongest response to said signal from said third station, means for confining transmission to and reception from said third station to said last-named selected antenna exclusive of the remainder, means for making information received in said second station from said first station available for transmission to said third station, and means for making information received in said station from said third station available for transmission to said first station.

6. A communication system comprising first, second and third stations, said second station serving as a repeater between said first and third stations and being at least partially unstabilized in attitude with respect thereto, said second station having a first repeater branch to accommodate signals to be conveyed from said first station to said third station, a second repeater branch to accommodate signals to be conveyed from said third station to said first station, and a plurality of antennas each oriented in a different direction the aggregate radiation pattern of which covers the entire field of activity of said second station, means for transmitting an information-bearing signal to said second station from said first station, means for transmitting an information-bearing signal to said second station from said third station, means for selecting the one of said plurality of antennas that receives the strongest response to said signal from said first station, means for switching in said one antenna to the output of said second repeater branch and the input of said first repeater branch, means for selecting the one of said plurality of antennas that receives the strongest response to said signal from said third station, and means for switching in said last-named one antenna to the output of said first repeater branch and the input of said second repeater branch.

7. In a plural channel communication system, means for selecting and utilizing the channel conveying the largest signal level comprising means for deriving a first set of samples of the signal level on each of said channels, means for deriving a second set of samples of the signal level on each of said channels an instant later, means for applying said first set to a storage circuit that stores the one sample of said first set having the largest potential, means for sensing and indicating when said second set assumes the potential of said stored sample of said first set, and means responsive to said indication for connecting the channel being sampled to a circuit used alternately by said channels.

8. In a communication system, a plurality of transmission paths, a common load circuit to be used alternately by said transmission paths, means for taking a first set of samples representative of the signal level of the signal carried on each of said transmission paths, means for taking a second set of samples representative of the signal level of the signal carried on each of said transmission paths immediately following said first set, a storage circuit comprising a diode in series with a capacitor, means for applying said first set to said storage circuit, a differential amplifier having two inputs, means for tapping off the potential stored on said capacitor and applying said potential to one input of said differential amplifier, means for applying said second set to the second input of said differential amplifier, means responsive to the output of said differential amplifier when said second set equals the potential stored on said capacitor for generating a control pulse, and means responsive to said control pulse for connecting the one of said transmission paths carrying the signal of highest level to said common load circuit.

9. An antenna system comprising twelve antenna elements each having identical circularly symmetrical radiation patterns distributed over the surface of a supporting structure such that each antenna covers a different solid angle the aggregate radiation pattern of which is isotropic.

10. An antenna system comprising twelve antenna elements each having identical circularly symmertical radiation patterns disposed on a body such that the radiation patterns of said antennas are uniformly distributed over a solid 360 degree angle the aggragate radiation pattern of which is substantially isotropic.

11. An antenna system for accommodating circularly polarized signals comprising twelve antenna elements each comprising a circular waveguide radiatior having a diameter of .64 wavelength of the circularly polarized signals accommodated, distributed over a supporting structure such that the radiation patterns of said antennas are uniformly distributed over a solid 360 degree angle the aggregate radiation pattern of which is substantially isotropic.

12. In a communication system, first and second stations remotely located and relatively movable with respect to one another, a first source of signals located at said first station, means for radiating said signal from said first source toward said second station, said second station having a plurality of antennas the radiation pattern of each covering a different portion of the desired field of activity of said second station, means for sampling the portion of said signal radiated from said first source intercepted by each of said antennas, means for determining the sample having the largest magnitude, a second source of signals to be transmitted to said first station, and means for connecting said second source to the antenna from which the sample having the largest magnitude was taken.

13. A communication station having multiple antenna units distributed about said station, the radiation pattern of each antenna unit being oriented in a different direction, a source of signals remotely located from and transmitted toward said station, means for developing a sample of the portion of said signal intercepted by each of said antenna units representative in magnitude of the signal level of said portion, means for determing the one of said samples having the largest magnitude, a utilization circuit located at said station, and means for connecting only the one of said antenna units associated with the sample having the largest magnitude to said utilization circuit.

14. In a communication station, a plurality of antennas each directed to operate in a different portion of the field of activity of said station, said antennas each having a receiving element and a corresponding transmitting element, a source of control signals remotely located from and radiated toward said station, a source of information signals to be radiated toward said source of control signals located at said station, said source of information signals being connected to the transmitting element of one of said antennas, means for deriving samples of the portion of said control signal intercepted by the receiving element of each of said antennas, means for determining the one of said samples having the largest magnitude, means for maintaining the connection between the transmitting element of said one antenna and said source of information signals when the sample associated with said one antenna is large in magnitude than the sample associated with any other of said antennas, and means for releasing the connection between the transmitting element of said one antenna and said source of information signals when the sample associated with said one antenna is smaller in magnitude than the sample associated with another of said antennas and for connecting said source of information signals to another of said antennas associated with the sample having the largest magnitude.

References Cited by the Examiner

UNITED STATES PATENTS 2,257,319 9/1941 Williams ---------- 343—100.4

LEWIS H. MYERS, *Primary Examiner.*

CHESTER L. JUSTUS, *Examiner.*